United States Patent [19]

Stengle, Jr.

[11] 3,922,450
[45] Nov. 25, 1975

[54] COATED GLASS CONTAINER AND METHOD FOR COATING SAME
[75] Inventor: Edward J. Stengle, Jr., Toledo, Ohio
[73] Assignee: Owens-Illinois, Inc., Toledo, Ohio
[22] Filed: June 28, 1973
[21] Appl. No.: 374,539

[52] U.S. Cl. ............. 428/35; 215/DIG. 6; 427/385; 427/407; 428/332; 428/432; 428/441; 428/520; 428/522
[51] Int. Cl.² .................. B32B 17/06; C03C 17/32
[58] Field of Search........ 117/124 E, 124 D, 94, 72, 117/6; 215/DIG. 6; 161/203; 428/35, 332, 432, 441; 260/DIG. 31

[56] References Cited
UNITED STATES PATENTS

| | | | |
|---|---|---|---|
| 3,131,077 | 4/1964 | Barnby et al. | 117/5.5 |
| 3,264,272 | 8/1966 | Rees | 117/127 X |
| 3,323,889 | 6/1967 | Carl et al. | 117/124 A |
| 3,415,673 | 12/1968 | Clock | 117/72 |
| 3,420,693 | 1/1969 | Scholes et al. | 117/94 X |
| 3,442,745 | 5/1969 | Salyer et al. | 156/334 X |
| 3,583,932 | 6/1971 | Benton et al. | 117/6 X |
| 3,764,458 | 10/1973 | Ziegel | 161/203 |
| 3,799,901 | 3/1974 | McCann et al. | 117/124 E X |
| 3,836,386 | 9/1974 | Roy | 428/333 |

*Primary Examiner*—Ralph Husack
*Attorney, Agent, or Firm*—Howard G. Bruss, Jr.; E. J. Holler

[57] ABSTRACT

Disclosed is a glass container coated with a loosely adhering film of thermoplastic ionic resin which film is capable of retaining glass fragments upon fracturing the glass container.

14 Claims, No Drawings

COATED GLASS CONTAINER AND METHOD FOR COATING SAME

It is well-known that glass in its pristine condition is a very strong material. Unfortunately, scratches and abrasion on the glass surface considerably decrease its strength. Consequently, glass containers such as jars, bottles, tumblers, and the like have their maximum strength as soon as they are formed and this strength diminishes as the containers come in contact with each other and with other surfaces as occurs during inspection, handling, packaging, shipping, and consumer use of glassware.

To overcome this problem, there has been a great deal of research in the glass industry towards development of thin, tenaciously adhering, lubricious, damage-preventive coatings which preserve the glass strength and allow the glass containers to be handled, filled, and used by the consumer.

Such damage-preventive coatings have been primarily of two types. In one type, the container is coated with a thin organic coating at the "cold end" of the annealing lehr where the temperature is in the neighborhood of 200°–400°F. These coatings have been water soluble polyoxyethylene stearate as in U.S. Pat. No. 2,813,045 (Abbott); polyethylene as in U.S. Pat. No. 2,995,533 (Parmer and Schaefer), and U.S. Pat. No. 2,965,596 (Scharf); or other organic materials as in U.S. Pat. Nos. 3,445,275 (Bogart); 3,487,035 (Bogart); 3,357,853 (Pickard); and 3,296,174 (Pickard).

In the second type of coating, the glass container is first coated by pyrolyzing metal compounds such as compounds of tin, titanium, vanadium, or zirconium at the hot end of the annealing lehr where the temperature is in the range of 1000° to 1100°F. and then overcoated with a protective organic coating at the cold end of the lehr. It is believed that this pyrolysis reaction forms the corresponding metal oxide although other metal compounds can be formed. For convenience in reference, the coatings formed by such pyrolysis are designated in terms of their oxides hereinafter. Such dual coatings are illustrated in U.S. Pat. Nos. 3,323,889 (Carl and Steigelman); 3,425,859 (Steigelman); 3,598,632 (Long); 3,554,787 (Plymale); 3,498,825 (Wiens); 3,418,154 (Rawski); 3,420,693 (Scholes and Pickard); 3,445,269 (Bruss et al.); 3,407,085 (Kitaj et al.); 3,414,429 (Bruss et al.); and 3,352,707 (Pickard). The above types of coatings are "production line" coatings because their application is accomplished as part of the forming and annealing sequence. The disclosures of the patents mentioned in the foregoing paragraphs are incorporated herein by reference.

The success of some of these and other types of coatings, particularly those "cold end" coatings of polyethylene or polyoxyethylene stearate (with or without the "hot end" coating of $TiO_2$ or $SnO_2$) in preserving the strength of the glass containers during inspection, handling, filling, and use has permitted glass researchers to focus on the problems caused by mishandling and accidental misuse of glass containers by the consumer.

Glass containers are sometimes fractured by dropping or other accidental misuse. This problem is particularly acute when the glass container has pressurized contents such as in the case of beer or carbonated soft drinks.

Accordingly, it is an object of the present invention to provide a coating for glass containers which is capable of retaining broken glass fragments upon fracture of the glass container so as to reduce the incidents of accidental injury.

Attention has been directed to this problem in the recent past. For instance, German patent disclosure 2,026,909, published Dec. 10, 1970, discloses coating a glass container with a loosely or firmly adhering plastic material designed to form a "bag" which retains glass fragments when the container is broken. The film is formed by fusing powdered polyethylene to the glass bottle. German patent document 2,149,219, published May 25, 1972, discloses coating glass containers with a film coating of a hydrolyzed ethylene-vinyl acetate copolymer. U.S. Pat. No. 3,178,049 discloses a light, composite glass container having a wall thickness of about 0.15 to 0.70 millimeters surrounded on the outside by an envelope of a thermoplastic material having a wall thickness at least equal to the glass. U.S. Pat. No. 3,415,673 discloses glass containers which are made resistant to breakage by coating the exterior surface with a thin, highly adhesive layer of plastic consisting essentially of a copolymer of ethylene and acrylic copolymers. A primer is used to tenaciously adhere the copolymer to the surface of the glass article.

The present invention improves over these types of coatings and provides an economical and expedient method of coating glass containers to provide the capability of retaining glass fragments upon fracture. Furthermore, the coatings according to the present invention can be applied over the lubricious, damage-preventive coatings of the types described above.

Accordingly, one feature of the present invention resides in a glass container having adhered to the exterior portion thereof a tough, resilient, flexible, continuous film of a thermoplastic ionic resin, said film being capable of retaining broken glass fragments upon fracture, said ionic resin comprising a carboxy copolymer of an alpha olefin monomer and an alpha, beta ethylenically unsaturated carboxylic acid, said copolymer containing ionized carboxylic acid groups resulting from the partial neutralization of said carboxylic acid with a cation, said film being so loosely adhered to said container that it can be integrally peeled from the container without leaving film residue on the container.

The thermoplastic ionic resin compositions per se are not part of the present invention and are available from such sources as the DuPont Company under the trade names of "SURLYN" and "ELVAX". Such resins are described in publications entitled "Properties of Ionomers: Coatings" by Jerome P. Broussard, pp 157–161, MODERN PACKAGING, May 1967; "Ionomers, Chemistry and New Developments" by Roy H. Kinsey, pp 77–94, APPLIED POLYMER SYMPOSIA No. 11 (1969); "Ionomer and Vinyl Resin Dispersions: Application Studies" by J. W. McDonald, pp 769–771, TAPPI Vol. 54, No. 5, May 1971; and "Ionic Bonding in Thermoplastic Resins" by Richard W. Rees, pp 1–4, DU PONT INNOVATION 2 (2) 1971. The disclosures of these publications are incorporated herein by reference.

As indicated above, the thermoplastic ionic resins are formed by the partial neutralization of carboxylic acid groups of a copolymer of an alpha, beta ethylenically unsaturated carboxylic acid and an alpha olefin monomer. The alpha, beta ethylenically unsaturated carboxylic acid can be a mono or polycarboxylic acid or acid anhydride having about 3 to 10 carbon atoms per molecule. Specific examples of such unsaturated carboxylic acids are acrylic acid, methacrylic acid, fumaric acid, maleic acid, and maleic anhydride and mixtures thereof. The alpha, olefin monomers include ethylene, propylene, butylene, and the like and mixtures thereof. Minor proportions (e.g., up to about 10% by weight of the copolymer) of other ingredients such as other vinyl monomers such as vinyl chloride, pigments, fillers, and colorants can be included if desired as long as they do not detract from the performance.

The major proportion of the copolymer is the alpha olefin monomer and the copolymer usually contains the equivalent of about 5% to about 25%, and usually about 5% to about 20% by weight of copolymerized carboxylic acid. The molecular weight of such copolymers are estimated to be in the 10,000 to 100,000 molecular weight range. The copolymers can be prepared by methods known in the art which include polymerization at elevated temperatures and pressures in the presence of free radical initiators.

The above copolymers are then converted to a thermoplastic ionic resin by partial neutralization with a cation so that about 5% to about 70%, and usually about 10% to about 60% of the carboxylic acid groups are neutralized. The neutralization reaction is carried out with salts containing cations such as $K^+$, $Na^+$, $Zn^{++}$, $Ca^{++}$, and $NH_4^+$, although neutralization with sodium ions is preferred for stability of the resin in aqueous dispersions.

The above thermoplastic ionic resins are applied to the glass container in the form of a liquid dispersion to form a wet coating on the exterior of the container. The wet coating is then heated at a temperature and for a time sufficient to coalesce the resin particles to form a tough, resilient, flexible, continuous film which is capable of retaining broken glass fragments upon fracture of the container, said film being so loosely adhered to the container that it can be integrally peeled from the container without leaving film residue thereon.

The liquid dispersing medium can be in the form of organic solvents such as alkanols, alkanes, or aromatic hydrocarbon liquids although aqueous dispersions are preferred for economy and efficiency.

In such aqueous dispersions, the thermoplastic ionic resin has an average particle size diameter in the range of about 0.01 to about 1 micron and is present in the dispersion in the proportion of about 1% to about 50% by weight of the dispersion. In general, higher concentrations in the range of 40–45% by weight are preferred so as to minimize the amount of water which must be volatilized to achieve a given coating thickness. Small amounts (up to about 10% by weight of the dispersion) of cross-linking agents and catalysts such as ammonium bromide and hexamethoxymethyl melamine can be included to increase the rate of film formation.

The above dispersions can be applied to the bottle in any conventional manner although dip coating and spray coating are commercially practical. In the dip coating technique, a warm or cool glass container is immersed in the liquid dispersion and withdrawn therefrom, then heat is applied to fuse and coalesce the film. In the spray coating technique, the concentrated dispersion is applied to a warm or cool glass container as a fine spray with subsequent heating to fuse and coalesce the film.

In either application technique, the dispersion is applied as a wet coating in an amount sufficient to yield a dry fused coating having a thickness in the range of about 1 mil to 10 mils.

Usually dry film thicknesses in the range of about 3 mils to about 7 mils are effective for retaining glass fragments even in the case of the fracture of pressurized glass container.

The wet coating is then fused and coalesced by heating to a temperature in the range of 100°F. to about 500°F. for about 1 minute to 30 minutes with the lower temperatures requiring the longer time periods. These lower coalescing temperatures have a tendency to form cloudy and streaked coatings. When transparency and clarity of the film is desired, coalescing temperature in the range of about 450°F. to 500°F. for 1 to 5 minutes are effective.

It is important in achieving the fragment retentive characteristics of the present invention that the film of thermoplastic ionic resin is not tightly adhered to the glass container so the glass fragments can tear away from the film without severing the film. Upon fracture, the film stretches independent of the breaking glass fragments to allow a slow release of any pressure. Such fragments may sometimes puncture the film, although the toughness and flexibility of the film minimize such puncture damage. The loose adherence of the thermoplastic film is characterized in that the film can be peeled from the glass surface as an integral film without leaving visible film residue on the glass surface. This simple peeling test indicates adhesive film failure rather than cohesive failure.

One of the primary advantages of the present invention is that the film of thermoplastic ionic resin can be applied directly over the lubricious, tenaciously adhering damage-preventive coatings applied on the production lines. For instance, a polyethylene coating applied as in Columns 3 and 4 of Parmer and Schaefer patent 2,995,533; a dual coating of $TiO_2$ and polyethylene applied as in Example 1 of Carl and Steigelman patent 3,323,889; or a dual coating of $SnO_2$ and polyethylene applied as in Scholes patent 3,420,693 can be readily coated with a thermoplastic ionic resin film according to the present invention.

In a particularly preferred practice of the present invention, the thermoplastic ionic resin is a copolymer of ethylene and methacrylic acid containing about 5% to about 20% by weight of copolymerized methacrylic acid with 10% to 60% of carboxyl group of such copolymerized methacrylic acid having been neutralized with a sodium salt or zinc salt. The molecular weight characteristics of such copolymers can be estimated from the Melt Flow Index of the copolymer prior to neutralization. The Melt Flow Index of such unneutralized copolymers according to ASTM test D-1238-62T is in the range of about 10 to 500 decigrams per minute.

One such thermoplastic ionic resin is formed from an ethylene-methacrylic acid copolymer containing 10% by weight methacrylic acid, and 90% by weight ethylene having a Melt Flow Index of 35 decigrams per minute prior to neutralization of the carboxyl groups. Ten percent of the carboxyl groups are neutralized with a zinc salt to yield a thermoplastic ionic resin having Melt Flow Index of 1.2 decigrams per minute. Other suitable ethylenemethacrylic acid thermoplastic ionic resins are characterized in the following Table I.

TABLE I

| % Meth-Acrylic Acid in Copolymer | Melt Flow Index of Copolymer | % of Carboxyl Groups Neutralized | Neutralization Cation | Melt Flow Index of Ionic Resin |
| --- | --- | --- | --- | --- |
| 9 | 10 | 14 | Zn | 5 |
| 11 | 100 | 56 | Zn | 5 |
| 15 | 60 | 20 | Zn | 14 |
| 10 | 500 | 25 | Zn | 100 |
| 10 | 500 | 12 | Zn | 230 |
| 10 | 500 | 10 | Na | 300 |

The invention will be further illustrated in the examples that follow wherein all parts are parts by weight, all percentages are weight percentages and all temperatures are in °F. unless stated otherwise.

EXAMPLE 1

Part A

An aqueous dispersion of thermoplastic ionic resin is used to dip-coat 12-ounce capacity non-returnable glass containers similar to the common one-way beer bottles. The aqueous dispersion comprises about 43% of thermoplastic ionic resin solids, 7% of hexamethoxymethyl melamine (cross-linking agent), with the balance comprising water with a small amount of dispersing agents.

The dispersed thermoplastic ionic resin has an average particle size diameter of about 0.2 micron and is prepared from a copolymer comprising 11% methacrylic acid and 89% ethylene having a Melt Flow Index of about 100 decigrams per minute, by neutralizing 30% of the carboxylic acid groups of such copolymer with a sodium salt. The Melt Flow Index of the resulting thermoplastic ionic resin is about 5 decigrams per minute.

The glass container at room temperature is dipped into the above dispersion which is also at room temperature so that all but the finish of the container is covered. The container is withdrawn from the dispersion and placed in an oven which has been preheated to 500°F. The container remains in the oven for 2–3 minutes after which it is removed and cooled to room temperature.

The above dipping procedure is repeated once to build up the dry film thickness. The resulting glass containers have adhered thereto a tough, resilient, flexible, transparent, continuous film of thermoplastic ionic resin. The film is about 4 to 5 mils thick and can be peeled from the container as an integral film without leaving visible film residue on the container.

Part B

Some of the coated containers from Part A are charged with 10 ounces of water and the containers are capped. The capped containers are then impact tested by dropping them from a height of 3 feet onto a large flat, steel plate. Some of the containers are dropped on the sidewall and others are dropped on the heel (i.e., the rounded portion of the base of the container).

Of the containers that fractured on sidewall impact with the steel plate, all of the broken glass is retained within the film and the film remains integral. When the containers are dropped on the heel, the film occasionally tears at the point of impact, although all of the glass fragments are retained in the vicinity of the fracture.

Part C

The procedures of Part B are repeated except that 100 grains of $NaHCO_3$ are added to the water in the container before capping. The containers are allowed to stand for 3 hours after which time a pressure of about 80 psig has developed therein from the reaction of the $NaHCO_3$.

The pressurized containers are impact tested as in Part B and similar results are obtained. Similar results are obtained when the procedures of Part A, Part B, and Part C are repeated starting with glass containers having a thin, tightly adhering coating of polyethylene coating applied as in Columns 3 and 4 of U.S. Pat. No. 2,995,533; or a dual coating of a pyrolyzed titanium compound and polyethylene applied as in Example 1 of U.S. Pat. No. 3,323,889; or a dual coating of pyrolyzed $SnCl_4$ at the "hot end" followed by the polyethylene treatment of 2,995,533 at the cold end.

Part D

Similar results are obtained when the six thermoplastic ionic resins described in Table I above are used as the thermoplastic ionic resin in the above procedures.

EXAMPLE 2

Several 12 ounce glass containers like those used in Example 1 are spray coated with the aqueous dispersion of thermoplastic ionic resin described in Part A of Example 1 by means of a conventional hand-operated spray gun.

The containers, at room temperature, are slowly rotated while a fine spray of the dispersion of thermoplastic ionic resin is applied for a few seconds. The sprayed containers are immediately placed in an oven which has been preheated to 500°F. for 5 minutes, after which time the containers are removed and cooled to room temperature.

The resulting glass containers have adhered thereto a tough, resilient, flexible, transparent, continuous film of thermplastic resin. The film is about 2 to 3 mils thick and can be peeled from the container as an integral film without leaving visible film residue on the container.

The coated containers are impact tested as in Part B and Part C of the Example 1 and similar results are obtained.

Having thus described the invention, what is claimed is:

1. A glass container having a thin layer of polyethylene thereon, said polyethylene layer having adhered to the exterior portion thereof a tough, resilient, flexible, continuous film of a thermoplastic ionic resin, said film being capable of retaining broken glass fragments upon fracture of said container, said ionic resin comprising a carboxy copolymer of an alpha olefin monomer and an alpha, beta ethylenically unsaturated carboxylic acid, said copolymer containing about 5% to about 25% by weight of copolymerized carboxylic acid, said copolymer containing ionized carboxylic acid groups resulting from the neutralization of about 5% to about 70% of said carboxylic acid groups with a cation selected from $K^+$, $Na^+$, $Zn^{++}$, $Ca^{++}$, and $NH_4^+$, said film being so loosely adhered that it can be integrally peeled from the container without leaving film residue.

2. The container of claim 1 wherein said film thickness is in the range of about 1 mil to about 10 mils.

3. The container of claim 2 wherein said film thickness is in the range of about 3 mils to about 7 mils.

4. The container of claim 1 wherein said ethylenically unsaturated carboxylic acid comprises methacrylic acid.

5. The container of claim 4 wherein said alpha olefin monomer comprises ethylene.

6. The glass container of claim 1 wherein said polyethylene is tenaciously adhered to said glass container by an intermediate layer of $TiO_2$ or $SnO_2$.

7. The method for coating outer portions of a glass container comprising the steps of applying a thin layer of polyethylene to said glass container, applying a liquid dispersion of thermoplastic ionic resin to form a wet coating over said layer of polyethylene, said ionic resin comprising a carboxy copolymer of an alpha olefin monomer and an ethylenically unsaturated carboxylic acid, said copolymer containing about 5% to about 25% by weight of copolymerized carboxylic acid, said copolymer containing ionized carboxylic acid groups resulting from the neutralization of about 5% to about 70% of said carboxylic acid groups with a cation selected from $K^+$, $Na^+$, $Zn^{++}$, $Ca^{++}$, and $NH_4^+$, heating said wet coating at a temperature and for a time sufficient to coalesce said wet coating into a tough, resilient, flexible continuous film which is capable of retaining broken glass fragments upon fracture of said container, said film being so loosely adhered that it can be integrally peeled from the container without leaving film residue.

8. The method of claim 7 wherein said dispersion in an aqueous dispersion containing thermoplastic ionic resin in the proportion of about 1% to about 50% by weight of said dispersion.

9. The method of claim 8 wherein the average particle size diameter of the dispersed thermoplastic ionic resin is in the range of about 0.01 to about 1 micron.

10. The method of claim 8 wherein said film thickness is in the range of about 1 mil to about 10 mils.

11. The method of claim 8 wherein said film thickness is in the range of about 3 mils to about 7 mils.

12. The method of claim 7 wherein said ethylenically unsaturated carboxylic acid comprises methacrylic acid.

13. The method of claim 12 wherein said alpha olefin monomer comprises ethylene.

14. The method of claim 7 wherein said polyethylene is tenaciously adhered to said glass container by intermediate layer of $TiO_2$ or $SnO_2$.

* * * * *